United States Patent
Oda (10) Patent No.: US 8,251,522 B2
(45) Date of Patent: Aug. 28, 2012

(54) LIGHT MODULATOR AND PROJECTION-TYPE DISPLAY APPARATUS

(75) Inventor: Atsushi Oda, Kanagawa (JP)

(73) Assignee: Sony Corporation (JP)

( * ) Notice: Subject to any disclaimer, the term of this patent is extended or adjusted under 35 U.S.C. 154(b) by 261 days.

(21) Appl. No.: 12/657,870

(22) Filed: Jan. 29, 2010

(65) Prior Publication Data
US 2010/0195060 A1   Aug. 5, 2010

(30) Foreign Application Priority Data
Feb. 5, 2009   (JP) ................... P2009-024542

(51) Int. Cl.
*G03B 21/28*   (2006.01)

(52) U.S. Cl. ........ 353/99; 353/30; 353/31; 353/85; 353/87; 353/98; 353/52; 353/53; 353/54; 353/55; 353/56; 353/119; 353/122

(58) Field of Classification Search ............. 353/30, 353/31, 85, 87, 98, 99, 52–61, 119, 122; 349/5, 7, 8, 9, 52, 58, 60, 150, 161; 359/246, 359/249, 259, 627, 634, 496, 497, 499, 500, 359/501; 362/218, 294, 373
See application file for complete search history.

(56) References Cited

U.S. PATENT DOCUMENTS

| | | | |
|---|---|---|---|
| 6,481,850 B1 * | 11/2002 | Takezawa et al. | 353/20 |
| 7,073,911 B2 * | 7/2006 | Yanagisawa | 353/56 |
| 7,365,821 B2 * | 4/2008 | Dewa et al. | 349/161 |
| 7,926,953 B2 * | 4/2011 | Yanagisawa et al. | 353/61 |
| 7,967,454 B2 * | 6/2011 | Hirabayashi et al. | 353/122 |
| 2002/0101729 A1 * | 8/2002 | Hayashi et al. | 362/84 |
| 2003/0174289 A1 * | 9/2003 | Nakano | 353/31 |
| 2009/0147175 A1 * | 6/2009 | Tsumura et al. | 349/58 |

FOREIGN PATENT DOCUMENTS

| | | |
|---|---|---|
| JP | 08-262432 A | 10/1996 |
| JP | 2001-318361 A | 11/2001 |

* cited by examiner

*Primary Examiner* — Georgia Y Epps
*Assistant Examiner* — Sultan Chowdhury
(74) *Attorney, Agent, or Firm* — Lerner, David, Littenberg, Krumholz & Mentlik, LLP (57) ABSTRACT

A light modulator includes: a holding member having a frame disposed around an opening; and a light modulation panel formed in such a way that the edge thereof is held by the frame and the outer surface of the portion corresponding to the opening is flush with the outer surface of the frame or positioned outside the outer surface of the frame.

4 Claims, 5 Drawing Sheets

LIGHT MODULATOR AND PROJECTION-TYPE DISPLAY APPARATUS

CROSS-REFERENCE TO RELATED APPLICATION

The present application claims priority from Japanese Patent Application No. JP 2009-024542 filed in the Japanese Patent Office on Feb. 5, 2009, the entire content of which is incorporated herein by reference.

BACKGROUND OF THE INVENTION

1. Field of the Invention

The present invention relates to a light modulator that modulates light to form an optical image and a projection-type display apparatus that uses the light modulator to display a projected image.

2. Description of the Related Art

In recent years, a liquid crystal projector is widely known as a projection-type display apparatus that displays a projected image. A liquid crystal projector is configured to modulate the light emitted from a light source by using a liquid crystal panel, which is a kind of light modulation panel, to form an optical image according to an image signal, enlarge and project the optical image through a projection lens, and display the enlarged image on a screen.

In the thus configured liquid crystal projector, in general, a housing thereof houses an air-cooling unit including an electric fan and an air passage duct. The air cooling unit produces an air flow along the panel surface of the liquid crystal panel, whereby the liquid crystal panel is cooled. The reason for the air cooling is that the heat resistance of the liquid crystal panel is lower than those of the light source, the power supply, and other components (see JP-A-08-262432 and JP-A-2001-318361, for example).

SUMMARY OF THE INVENTION

The liquid crystal panel that forms the liquid crystal projector is typically held in a holding member called a bezel for use. Specifically, the edge of a liquid crystal panel 101 having a flat plate-like shape is held by a frame-like holding member 102, as shown, for example, in FIG. 7. The holding member 102 has openings 103 and 104 provided in the front and rear surfaces thereof, respectively, in corresponding with an effective image area of the liquid crystal panel 101. The liquid crystal panel 101 modulates the light passing through the openings 103 and 104 and the effective image area to form an optical image according to the image signal.

Figure 7:
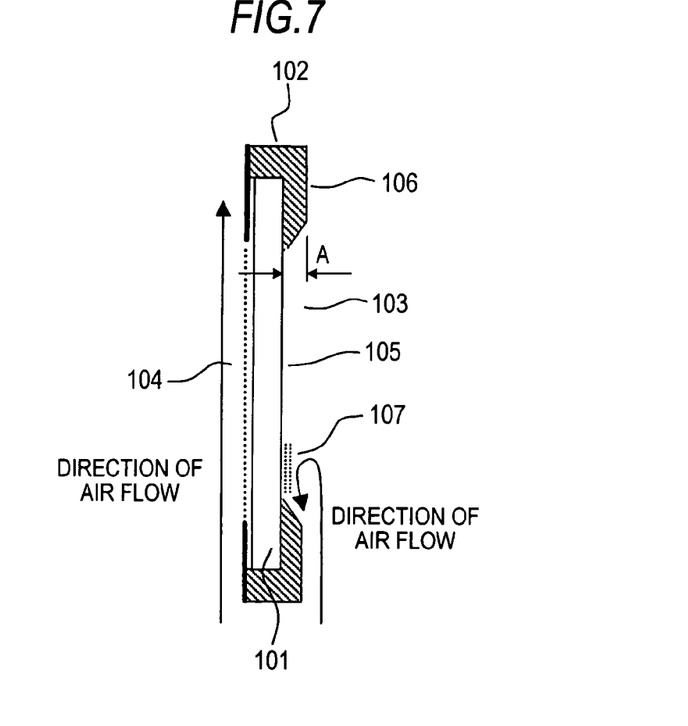
FIG. 7 is a descriptive diagram showing an exemplary configuration of a panel unit used in a liquid crystal projector of related art.

In the panel holding structure described above, however, a step is disadvantageously created between an outer surface 105 of the liquid crystal panel 101 and an outer surface 106 of the frame portion of the holding member 102, the step corresponding to the thickness of the frame portion (see A in FIG. 7).

When such a step is present and the cooling unit produces an air flow along the panel surface, it is conceivable that a turbulent flow, such as swirls, disadvantageously occurs in the step. The produced turbulent flow could then likely cause dust 107 contained in the air flow to accumulate on the panel slightly spaced apart from the step.

When the dust 107 accumulates in the effective image area on the panel surface of the liquid crystal panel 101, an image projected on the screen will disadvantageously be accompanied with a shadow corresponding to the dust 107. That is, the dust 107 accumulated in the effective image area leads to degradation in the quality of the image displayed on the screen.

Thus, it is desirable to provide not only light modulator having a holding structure that prevents dust from accumulating on a panel surface even when an air flow is produced along the panel surface for cooling purposes but also a projection-type display apparatus.

An embodiment of the invention is directed to a light modulator including a holding member having a frame disposed around an opening and a light modulation panel formed in such a way that the edge thereof is held by the frame and the outer surface of the portion corresponding to the opening is flush with the outer surface of the frame or positioned outside the outer surface of the frame.

In the thus configured light modulator, the outer surface of the light modulation panel viewed through the opening of the holding member is flush with the outer surface of the frame of the holding member or positioned outside the outer surface. That is, the outer surface of the light modulation panel and the outer surface of the frame of the holding member create no recessed step. Therefore, even when an air flow is produced along the panel surface to cool the light modulation panel, no swirl or turbulent flow will be produced in the recessed step, or dust will not accumulate on the panel surface due to the produced turbulent flow.

According to the embodiment of the invention, even when an air flow is produced along the panel surface to cool the light modulator, no dust will accumulate on the panel surface. Therefore, using the light modulator to project an image on a screen will not lead to degradation in the quality of the displayed image due to an accompanied shadow corresponding to the accumulated dust.

DESCRIPTION OF THE PREFERRED EMBODIMENTS

A light modulators and a projection-type display apparatus according to an embodiment of the invention will be described below with reference to the drawings.
[Description of Projection-Type Display Apparatus]

The projection-type display apparatus will first be described.

As an example of the projection-type display apparatus, a liquid crystal projector will be described in the following description.

A liquid crystal projector is configured to modulate the light emitted from a high-pressure mercury lamp or any other light source by using a liquid crystal panel, which is a kind of light modulation panel, to form an optical image according to an image signal, enlarge and project the optical image through a projection lens, and display the enlarged image on a screen. A well known example of the liquid crystal projector of this type is what is called a three-panel projector including liquid crystal panels corresponding to R (red), G (green), and B (blue).

Figure 1:
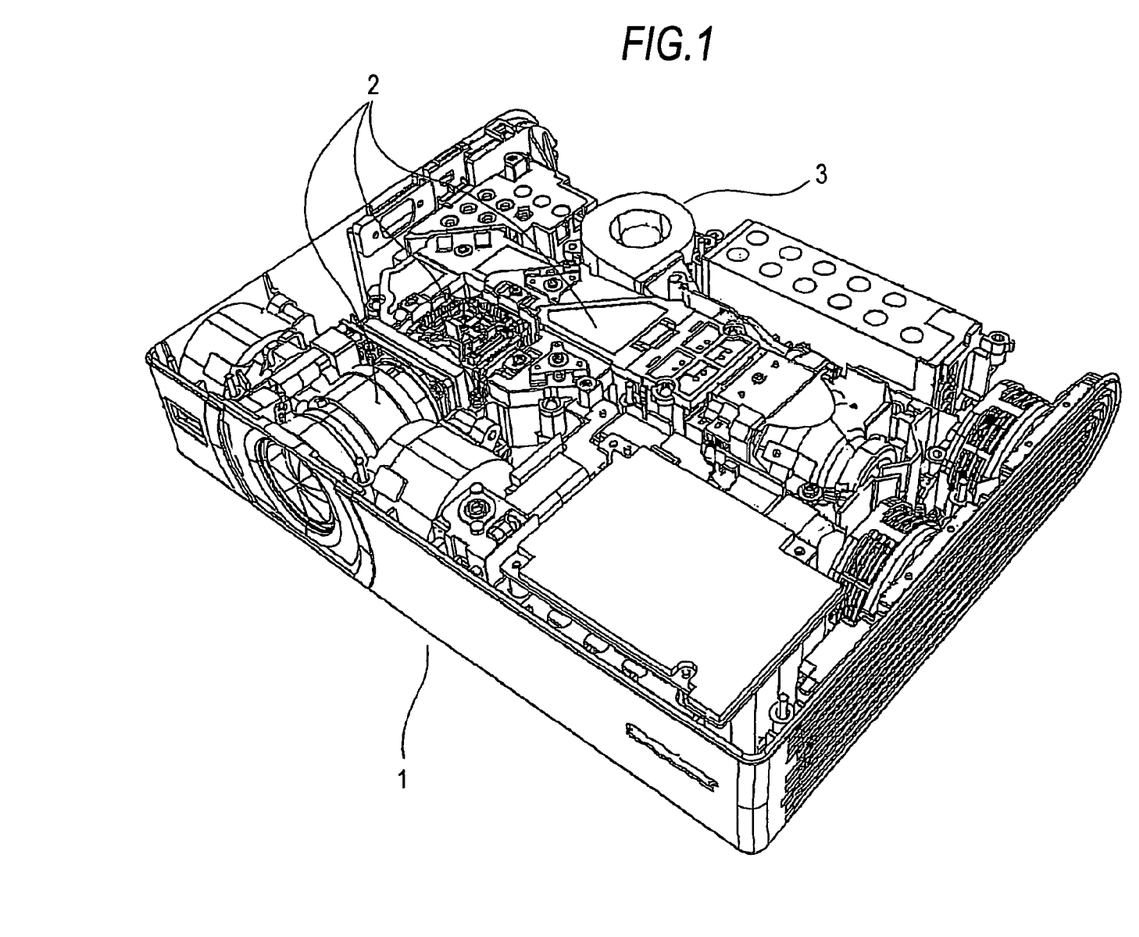
FIG. 1 is a descriptive diagram showing an exemplary schematic configuration of a liquid crystal projector.

FIG. 1 is a descriptive diagram showing an exemplary schematic configuration of a liquid crystal projector.

As illustrated, the liquid crystal projector includes a housing 1, and an optical system unit 2 and an air cooling unit 3 housed therein.

The optical system unit 2 projects and displays a color image on a screen.

The air cooling unit 3 primarily cools the optical system unit 2. The air cooling unit 3 may also cool electronic parts (for example, electronic circuit parts for driving liquid crystal panels that form the optical system unit 2) disposed in the housing 1 as well as the optical system unit 2.

The units 2 and 3 will be described below in this order.

Figure 2:
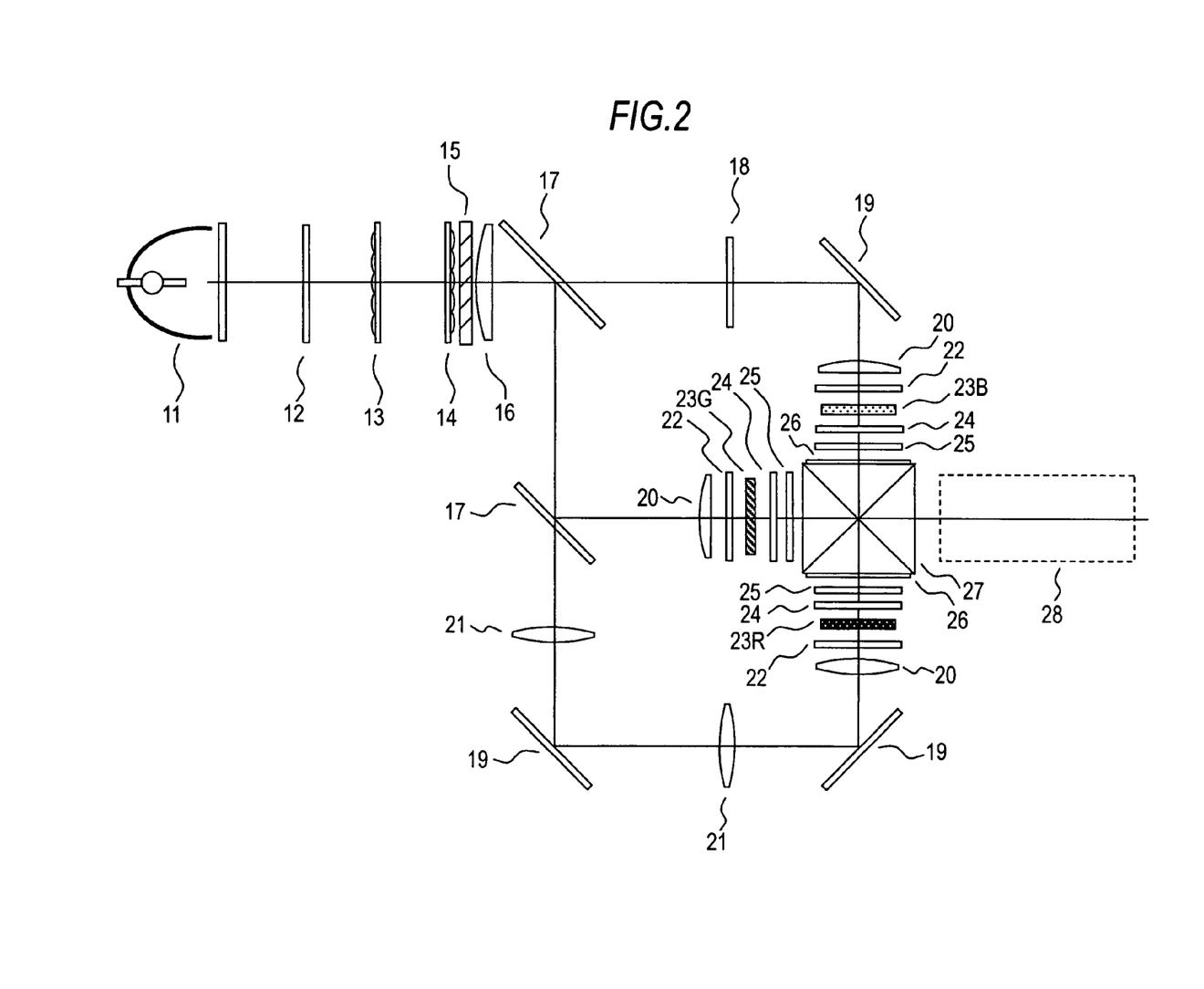
FIG. 2 is a descriptive diagram showing an exemplary configuration of an optical system unit in a three-panel liquid crystal projector.

FIG. 2 is a descriptive diagram showing an exemplary configuration of the optical system unit 2 in a three-panel liquid crystal projector. FIG. 2 shows an exemplary configuration of the optical system unit 2 in a liquid crystal projector using transmissive liquid crystal panels.

In the illustrated optical system unit 2, the light emitted from a light source 11 passes through a filter 12 that eliminates infrared light and ultraviolet light, a first fly-eye lens 13, a second fly-eye lens 14, a polarization conversion element 15, and a collector lens 16. The light having passed through the above components is incident on dichroic mirrors 17, each of which reflects only the light having a specific wavelength band, and the dichroic mirrors 17 separate the light into RGB color component light beams. Part or all of the RGB color component light beams pass through or are reflected off as necessary a filter 18 that absorbs ultraviolet light, total reflection mirrors 19, condenser lenses 20, relay lenses 21, and other optical components and are incident on liquid crystal panels 23R, 23G, and 23B provided in correspondence with the RGB colors. Each of the liquid crystal panels 23R, 23G, and 23B is provided with a light incident-side polarizer 22, an optical compensator 24, and a light exiting-side polarizer 25. The color component light beams having passed through the light incident-side polarizers 22 are incident on the respective liquid crystal panels 23R, 23G, and 23B, and the color component light beams modulated by the respective liquid crystal panels 23R, 23G, and 23B pass through the optical compensators 24 and the light exiting-side polarizers 25. After the liquid crystal panels 23R, 23G, and 23B perform light modulation according to a video signal, the color component light beams having undergone the light modulation pass through half-wave films 26 as necessary, are combined by a dichroic prism 27, and are enlarged and projected through a projection lens 28. The optical system unit 2 thus projects and displays a color image on the screen.

Figure 3:
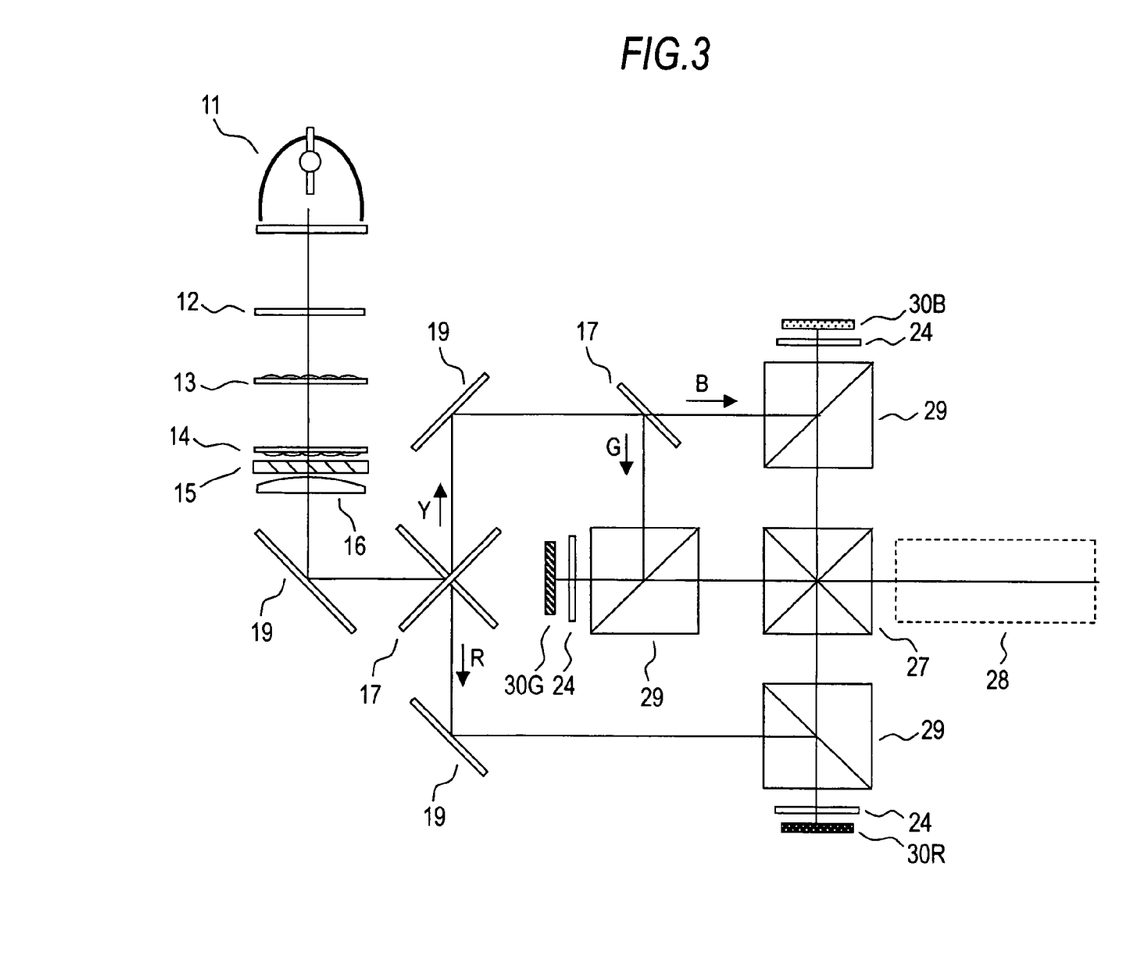
FIG. 3 is a diagrammatic view showing another exemplary schematic configuration of the optical system unit in the three-panel liquid crystal projector.

FIG. 3 is a diagrammatic view showing another exemplary schematic configuration of the optical system unit 2. FIG. 3 shows an exemplary configuration of the optical system unit 2 in a liquid crystal projector using reflective liquid crystal panels.

In the optical system unit 2 illustrated in FIG. 3 as well, the light emitted from the light source 11 passes through the filter 12, the first fly-eye lens 13, the second fly-eye lens 14, the polarization conversion element 15, and the collector lens 16, as in the case where transmissive liquid crystal panels are used (see FIG. 2). The light having passed through the above components is incident on the dichroic mirrors 17, which separate the light into RGB color component light beams. Thereafter, the color component light beams pass through or are reflected off the total reflection mirrors 19, polarizing beam splitters (PBS) 29, and quarter-wave plates 24 as necessary and are incident on reflective liquid crystal panels 30R, 30G, and 30B provided in correspondence with the RGB colors. The reflective liquid crystal panels 30R, 30G, and 30B perform light modulation according to a video signal, and the color component light beams having undergone the light modulation are combined by the dichroic prism 27 and enlarged and projected through the projection lens 28. The optical system unit 2 thus displays a color image on the screen.

In FIG. 1, the air cooling unit 3 includes an electric fan and an air passage duct to cool the interior of the housing 1. The electric fan is, for example, formed of a sirocco fan motor, sucks air into the housing 1, and delivers the sucked air as cooling air. The air passage duct guides the cooling air from the electric fan to, for example, the locations where the liquid crystal panels are disposed in the optical system unit 2. The cooling air guided through the air passage duct undergoes a heat exchanging process in the vicinity of the optical system unit 2 and is then discharged out of the housing 1.

That is, the air cooling unit 3 is designed to guide the cooling air from the electric fan through the air passage duct to the optical system unit 2. In this way, the air cooling unit 3 produces a cooling air flow along the surface of each of the liquid crystal panels in the optical system unit 2, as will be described in detail later.

The liquid crystal projector presented as an example is schematically configured as described above and mainly characterized by a structure for holding each of the liquid crystal panels used in the optical system unit 2.

[Description of Light Modulator]

The structure for holding each of the liquid crystal panels, that is, the configuration of a panel unit containing each of the liquid crystal panels, will next be described in detail.

The panel unit described below corresponds to a specific example of the light modulator according to an embodiment of the invention.

First Embodiment

Figure 4:
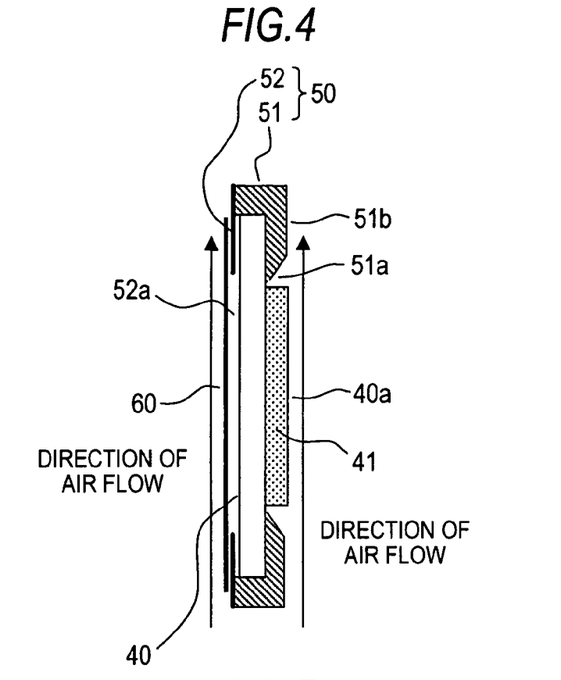
FIG. 4 is a descriptive diagram showing an exemplary configuration of a panel unit in a first embodiment to which the invention is applied.

FIG. 4 is a descriptive diagram showing an exemplary configuration of the panel unit in a first embodiment to which the invention is applied.

The illustrated panel unit includes a liquid crystal panel 40 and a holding member 50 that holds the liquid crystal panel 40. The liquid crystal panel 40 functions as any of the liquid crystal panels 23R, 23G, 23B, 30R, 30G, and 30B in the optical system unit 2 described above.

The holding member 50, which is called a bezel, includes a first frame 51 and a second frame 52 and is configured to hold the panel edge of the liquid crystal panel 40.

The first frame 51 is shaped in such a way that it not only abuts the panel edge of the liquid crystal panel 40 and supports the edge but also abuts the panel end of the liquid crystal panel 40 and can constrain the position thereof in the panel surface direction. Further, the first frame 51 is provided with an opening 51a that is positioned in correspondence with the effective image area of the liquid crystal panel 40 held by the first frame 51 and at least larger than the effective image area but smaller than the size of the panel edge of the liquid crystal panel 40. The first frame 51 is conceivably formed, for example, by molding a resin material.

The second frame 52 has a shape capable of sandwiching the panel edge of the liquid crystal panel 40 between the first frame 51 and the second frame 52. That is, the second frame 52 is mounted on the first frame 51 into which the liquid crystal panel 40 fits in such a way that the second frame 52 covers the side of the first frame 51 where the liquid crystal panel 40 is exposed, whereby the liquid crystal panel 40 can be held and secured. The second frame 52 is also provided with an opening 52a that is positioned in correspondence with the effective image area of the liquid crystal panel 40 held by the first frame 51 and at least larger than the effective image area but smaller than the size of the panel edge of the liquid crystal panel 40 as well as the first frame 51. The second frame 52 is conceivably formed, for example, by performing sheet metal working on a metal material.

That is, the holding member 50 is formed of the first frame 51 and the second frame 52 surrounding the openings 51a and 52a corresponding to the effective image area of the liquid crystal panel 40. The first frame 51 and the second frame 52 are not necessarily made of those separately specified in the specific example described above, but both of the first and second frames may alternatively be made of, for example, a resin material as appropriate.

In the liquid crystal panel 40 whose edge is held by the first frame 51 and the second frame 52, at least the side of the liquid crystal panel 40 where the first frame 51 formed by molding a resin material is present is configured as follows: That is, the liquid crystal panel 40 is formed in such a way that an outer surface 40a of the portion corresponding to the opening 51a of the first frame 51 is flush with an outer surface 51b of the first frame 51 or positioned outside the outer surface 51b of the first frame 51.

The portion of the liquid crystal panel 40 corresponding to the opening 51a is the portion viewed through the opening 51a of the first frame 51 when the liquid crystal panel 40 is held by the first frame 51 and at least including the effective image area in the panel surface of the liquid crystal panel 40.

Therefore, when the liquid crystal panel 40 is held by the first frame 51, the outer surface 40a of the portion including the effective image area in the panel surface of the liquid crystal panel 40 is flush with the outer surface 51b of the first frame 51 or positioned at a level spaced apart outward from the outer surface 51b.

In the first embodiment being described, the thus configured liquid crystal panel 40 is achieved as follows: That is, the liquid crystal panel 40 in the first embodiment is formed by attaching a flat plate-shaped, light-transmissive member 41 having a size corresponding to the opening 51a of the first frame 51 onto a flat panel body surface. The size corresponding to the opening 51a is a size that can fit into the opening 51a and at least includes the effective image area in the panel surface of the liquid crystal panel 40.

The light-transmissive member 41 has a thickness equal to or larger than the step between the panel body surface of the liquid crystal panel 40 and the outer surface 51b of the first frame 51 in order to achieve the position of the outer surface 40a described above.

An example of the thus formed light-transmissive member 41 is conceivably a glass plate. Alternatively, a transparent resin plate, a transparent resin film, and any other similar component may be used as long as they transmit light. It is noted, however, that to prevent the light unnecessarily from being refracted, the light-transmissive member 41 desirably has light transmittance equivalent to that of the material of the substrate that forms the panel body of the liquid crystal panel 40.

Attaching the light-transmissive member 41 to the panel body of the liquid crystal panel 40 is conceivably carried out, for example, by using an adhesive that transmits light. Alternatively, an adhesive that does not transmit light or screws or any other suitable fasteners disposed outside the effective image area may be used as long as they at least do not compromise the light transmittance in the effective image area of the liquid crystal panel 40.

On the side where the second frame 52 is present, a film member 60 is attached to cover the opening 52a of the second frame 52.

Examples of the film member 60 may conceivably be a triacetyl-cellulose film and a polyacetal-cellulose film, which excel in non-flammability, transparency, electrical insulation performance, and other properties.

The reason why the film member 60 is attached to the second frame 52 is that the second frame 52 is formed, for example, by sheet metal working. That is, when the second frame 52 is formed of a metal plate, no large step causing the problem of dust accumulation will be created between the panel body surface of the liquid crystal panel 40 and the second frame 52.

Therefore, for example, when the second frame 52 is formed by molding a resin material, or when the second frame is formed by sheet metal working but a large step is created, it is conceivable that the outer surface of the liquid crystal panel 40 on the side where the second frame 52 is present is configured in the same manner as on the side where the first frame 51 is present.

The thus configured panel unit is used in the optical system unit 2 of the liquid crystal projector. When the panel unit is used in the optical system unit 2, and the effective image area of the liquid crystal panel 40 modulates the light emitted from the light source and passing through the openings 51a and 52a in the holding member 50, an optical image according to the image signal is formed.

Since the panel unit is used in the optical system unit 2 of the liquid crystal projector, the panel unit is cooled by a cooling air flow produced by the air cooling unit 3. In this process, the air cooling unit 3 produces a cooling air flow along the surface direction of the panel unit (see the arrows shown in FIG. 4).

Therefore, in the vicinity of the panel unit and, for example, on the side where the first frame 51 is present, an air flow is produced along the outer surface 51b of the first frame 51 and the outer surface 40a of the liquid crystal panel 40 viewed through the opening 51a in the first frame 51. The air flow then cools the liquid crystal panel 40.

In the thus configured panel unit, the outer surface 40a of the liquid crystal panel 40 viewed through the opening 51a of the first frame 51 is flush with the outer surface 51b of the first frame 51 or positioned outside the outer surface 51b. That is, the outer surface 40a of the liquid crystal panel 40 and the outer surface 51b of the first frame 51 of the holding member 50 will not create a recessed step.

Therefore, even when an air flow is produced along the panel surface to cool the liquid crystal panel 40, no swirl or turbulent flow will be produced in the recessed step, or dust will not accumulate on the panel surface due to the produced turbulent flow.

As described above, in the thus configured panel unit, even when an air flow is produced along the panel surface to cool the panel unit, no dust will accumulate on the panel surface.

Therefore, using the panel unit disposed in the optical system unit 2 of the liquid crystal projector to project an image on the screen will not lead to degradation in the quality of the displayed image due to an accompanied shadow corresponding to the accumulated dust.

Further, in the thus configured panel unit, the recessed step in the first frame 51 is canceled by attaching the light-transmissive member 41 to the panel body surface of the liquid crystal panel 40. Therefore, the panel unit can be applied to a typically configured panel body, whereby the formation of the liquid crystal panel 40 can be highly flexible. Further, since what is necessary is only attaching the light-transmissive member 41, the increase in manufacturing cost can be reduced because the manufacturing efficiency is improved.

Second Embodiment

Figure 5:
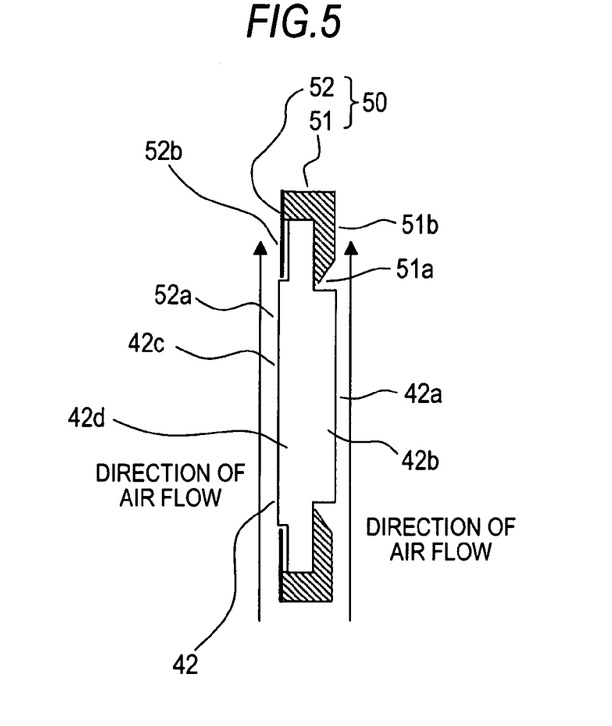
FIG. 5 is a descriptive diagram showing an exemplary configuration of the panel unit in a second embodiment to which the invention is applied.

FIG. 5 is a descriptive diagram showing an exemplary configuration of the panel unit in a second embodiment to which the invention is applied.

The illustrated panel unit differs from that in the first embodiment in terms of the configuration of a liquid crystal panel 42. The holding member 50 that holds the liquid crystal panel 42 is the same as that in the first embodiment. The description of the holding member 50 is therefore omitted.

On the side where the first frame 51 is present, the liquid crystal panel 42 is formed in such a way that an outer surface 42a of the portion corresponding to the opening 51a of the first frame 51 is flush with the outer surface 51b of the first frame 51 or positioned outside the outer surface 51b of the first frame 51. The second embodiment is the same as the first embodiment in this regard.

In the second embodiment being described, the configuration of the liquid crystal panel 42 is achieved as follows: That is, in the liquid crystal panel 42 in the second embodiment, a component substrate that forms the outer surface 42a of the portion corresponding to the opening 51a of the first frame 51 has a raised shape formed of a protrusion sized in correspondence with the opening 51a. That is, the component substrate on the side where the first frame 51 is present has a raised portion 42b corresponding to the opening 51a. The size corresponding to the opening 51a is a size that can fit into the opening 51a and at least includes the effective image area in the panel surface of the liquid crystal panel 40. The amount of protrusion of the raised portion 42b is equal to the thickness of the first frame 51 (that is, the step between the outer surface 51b of the first frame 51 and the panel surface of the liquid crystal panel 40) or larger than the step in order to achieve the position of the outer surface 42a described above.

Further, on the side where the second frame 52 is present, the liquid crystal panel 42 in the second embodiment is formed in such a way that an outer surface 42c of the portion corresponding to the opening 52a of the second frame 52 is flush with an outer surface 52b of the second frame 52 or positioned outside the outer surface 52b of the second frame 52. The configuration of the liquid crystal panel 42 described above is also conceivably achieved in the same manner as the configuration on the side where the first frame 51 is present. That is, the component substrate on the side where the second frame 52 is present has a raised portion 42d corresponding to the opening 52a.

It is noted, however, that the raised portion 42d is not necessarily formed on the component substrate of the liquid crystal panel 42 on the side where the second frame 52 is present, but the film member 60 may be attached as in the first embodiment.

Figure 6:
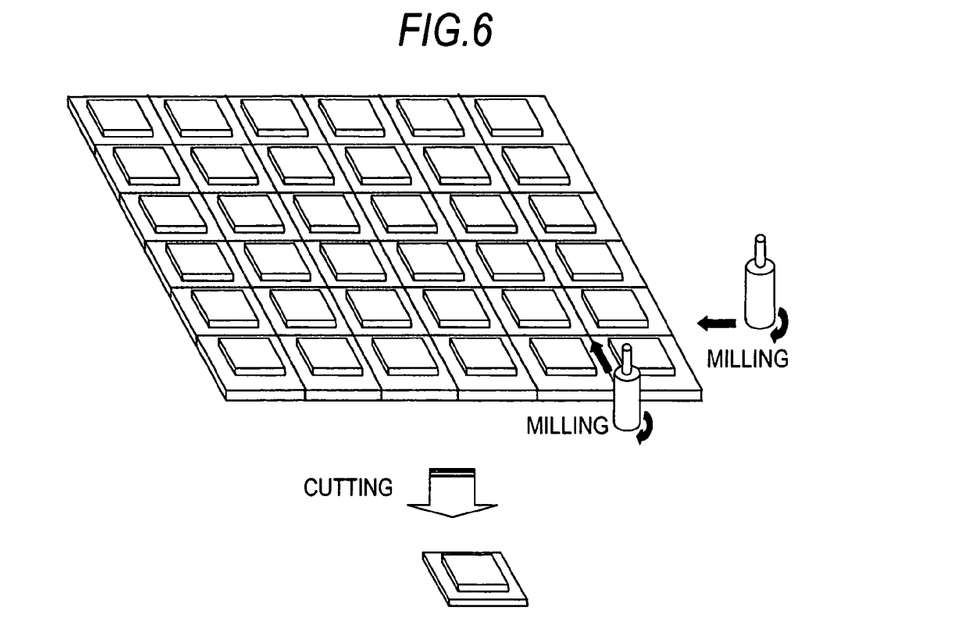
FIG. 6 is a descriptive diagram showing a specific example of the procedure of forming a component substrate having a raised portion.

The component substrate of the liquid crystal panel having the raised portions 42b and 42d is conceivably formed in the following procedure:

FIG. 6 is a descriptive diagram showing a specific example of the procedure of forming the component substrate having a raised portion.

In the formation of the component substrate of the liquid crystal panel 42, a flat plate-shaped, compound substrate from which a plurality of component substrates is produced is first prepared. For example, when the component substrate is a glass substrate, a large glass flat plate is prepared. End milling using a milling machine is, for example, performed on the compound substrate to form a plurality of raised portions. After the raised portions are formed, the compound substrate is cut and separated into individual component substrates. In this way, a component substrate with a raised portion having a rectangular shape when viewed from the above is formed.

After the component substrate with the raised portion is formed, well known manufacturing processes may be used to form the liquid crystal panel 42 based on the component substrate.

In the thus configured panel unit as well, the outer surface 42a of the liquid crystal panel 42 viewed through the opening 51a of the first frame 51 is flush with the outer surface 51b of the first frame 51 or positioned outside the outer surface 51b, as in the first embodiment. That is, the outer surface 42a of the liquid crystal panel 42 and the outer surface 51b of the first frame 51 of the holding member 50 create no recessed step.

Therefore, in the thus configured panel unit, even when the panel unit is used in the optical system unit 2 of the liquid crystal projector and an air flow is produced along the panel surface to cool the panel unit, no dust will accumulate on the panel surface. As a result, using the panel unit disposed in the optical system unit 2 of the liquid crystal projector to project an image on the screen will not lead to degradation in the quality of the displayed image due to an accompanied shadow corresponding to the accumulated dust.

Further, in the thus configured panel unit, the recessed steps in the first frame 51 are canceled by forming the raised portions 42b and 42d on the component substrate of the liquid crystal panel 42. Therefore, since the one-piece component substrate is used to cancel the steps, a satisfactory optical image can be readily formed without considering the effect of light refraction and other effects. Further, since the one-piece component substrate is used, the number of parts is reduced and hence the configuration is simplified as compared with a case where a separate part is necessary.

While preferred specific embodiments of the invention have been described above, the invention is not limited thereto.

For example, while the above embodiments have been described with reference to a liquid crystal projector as the projection-type display apparatus, the invention can be applied in the same manner to other projection-type display apparatus, that is, those using devices other than a liquid crystal panel as the light modulator, as long as the interior of the housing needs to be cooled.

As described above, the invention is not limited to what has been described in the above embodiments, but changes can be made to the invention as appropriate to the extent that they do not depart from the spirit of the invention.

What is claimed is:

1. A light modulator comprising:
   a holding member having a frame disposed around an opening; and
   a light modulation panel arranged such that (i) an edge thereof is held by the frame, and (ii) an outer surface of a portion thereof corresponding to the opening which includes at least an effective image area is flush with an outer surface of the frame or positioned outward of the outer surface of the frame.

2. The light modulator according to claim 1, wherein the light modulation panel is formed by attaching a flat plate-shaped, light-transmissive member having the size corresponding to the opening to a flat panel body surface.

3. The light modulator according to claim 1, wherein the light modulation panel is configured in such a way that a component substrate that forms the outer surface of the portion corresponding to the opening has a raised shape formed of a protrusion sized in correspondence with the opening.

4. A projection-type display apparatus comprising:
a light source that emits light;
a holding member having a frame disposed around an opening;
a light modulation panel arranged such that (i) an edge thereof is held by the frame, and (ii) an outer surface of a portion thereof corresponding to the opening which includes at least an effective image area is flush with an outer surface of the frame or positioned outward of the outer surface of the frame, the light modulation panel modulating the light from the light source;
a projection lens that projects an optical image formed by the light modulation performed in the light modulation panel; and
an air cooling unit that produces an air flow along the outer surface of the frame in the holding member and the outer surface of the light modulation panel viewed through the opening in the holding member to cool the light modulation panel;
in which during operation dust is prevented from accumulating on the effective image area of the portion of the light modulation panel.

* * * * *